United States Patent [19]

Odashima et al.

[11] 3,749,307
[45] July 31, 1973

[54] BIFUNCTIONAL THERMOSTAT DEVICE FOR A HEATING TYPE REFRIGERATOR HAVING BOTH AN ELECTRIC HEATER AND A GAS HEATER

[75] Inventors: Takeshi Odashima, Tokorozawa; Takeo Makita, Sayama, both of Japan

[73] Assignee: Kabushiki Kaisha Saginomiya Seisakusho, Tokyo, Japan

[22] Filed: Dec. 6, 1971

[21] Appl. No.: 204,999

[30] Foreign Application Priority Data
Dec. 9, 1970  Japan.............................. 45/121926

[52] U.S. Cl.................. 236/48, 62/148, 200/61.89, 219/279, 236/99, 337/1
[51] Int. Cl. ......................................... G05d 29/00
[58] Field of Search...................... 236/15 A, 99, 48; 62/148; 200/61.89; 219/279 X; 337/1

[56] References Cited
UNITED STATES PATENTS
2,422,482   6/1947   Guyer.............................. 219/279 X
2,463,712   3/1949   Newell........................... 236/15 A X

*Primary Examiner*—William E. Wayner
*Attorney*—John J. McGlew et al.

[57] ABSTRACT

A bifunctional thermostat device for a heating type refrigerator having both an electric heater and a gas heater comprises a bellows whose internal pressure is controlled by a temperature sensitive member connected by a capillary tube to the bellows. A pivoted L-shaped lever has a first leg engageable with the movable outer end of the bellows and a second leg connected to operate a normally closed snap action switch controlling energization of an electric heater. The lever is biased in one direction by a spring connected to a cam follower having an end projecting outwardly and into engagement with a temperature setting cam. A diaphragm type valve controls the supply of gas to the gas heater and the diaphragm is spring biased to an open position. A pin secured to the diaphragm engages a lever assembly pivoted intermediate its ends, and a rigid rod is engaged between a free end of the lever assembly and the first arm of the L-shaped lever. When the internal pressure of the bellows decreases, due to a decrease in the refrigeration temperature, the L-shaped lever pivots to snap open the switch and to rotate the lever assembly to cause the pin to move the diaphragm toward a valve closing position.

6 Claims, 3 Drawing Figures

3,749,307

BIFUNCTIONAL THERMOSTAT DEVICE FOR A HEATING TYPE REFRIGERATOR HAVING BOTH AN ELECTRIC HEATER AND A GAS HEATER

FIELD AND BACKGROUND OF THE INVENTION

This invention relates to a thermostat device, and more particularly to a bifunctional thermostat device for a heating type refrigerator having both an electric heater and a gas heater.

In a known refrigerator having both an electric heater and a gas heater, it is usually necessary to employ two independently-operated separate regulating equipments, namely a thermostat for the electrical heater and a thermostatic gas valve for the gas heater, disposed in the refrigerator, so that the automatic regulation of a preset refrigerating temperature is surely effected in both the electric heater and the gas heater.

A disadvantage of such known temperature regulating system is that a relatively large space is required for accomodating such temperature regulating system in the refrigerator and such system is complicated in structure, since many kinds of elements having the same function are used in double.

SUMMARY OF THE INVENTION

Accordingly, it is a primary object of this invention to provide a bifunctional thermostat device for a heating type refrigerator having both an electric heater and a gas heater, which functions not only as a thermostat in the electric heater circuit, but also as a thermostatic gas valve in gas supply line of the gas heater.

It is another object of this invention to provide a bifunctional thermostat device of the kind described, which can be simply controlled by adjusting a shaft to preset a refrigerating temperature.

It is still further object of this invention to provide a bifunctional thermostat device of the character described, which is simple in structure and compact whereby it can readily been accomodated in the refrigerator.

According to the present invention, there is provided a bifunctional thermostat device for a heating type refrigerator having both an electric heater and a gas heater which comprises a pressure member actuated responsive to temperature change of a temperature sensitive member, an L-shaped actuating lever which is pivotable at its angular portion and has one leg portion in contact with the pressure member, and a quick-action snap switch means connected to the other leg portion of the L-shaped actuating lever through the medium of a connecting rod. A cam member is provided for setting a refrigerating temperature, and a cam follower has one end in contact with the cam member and is pivotally secured at the other end thereof. A tension spring is provided between the other leg portion of the L-shaped actuating lever and the cam follower. A valve is provided, including a valve casing and a valve body which are, when the refrigerating temperature is higher than the preset temperature, in the open relationship by the action of a compression spring provided therebetween. A value actuating means is connected to the one leg portion of the L-shaped actuating lever and adapted to actuate the valve body against the bias of the compression spring.

To the accomplishment of the foregoing and related objects, the invention, then, comprises the features hereinafter fully described and particularly pointed out in the claims, the following description and the annexed drawings setting forth in detail one illustrative embodiment of the invention, this being indicative, however, of but one of the various ways in which the principle of the invention may be employed.

DESCRIPTION OF THE PREFERRED EMBODIMENT

Figure 1:
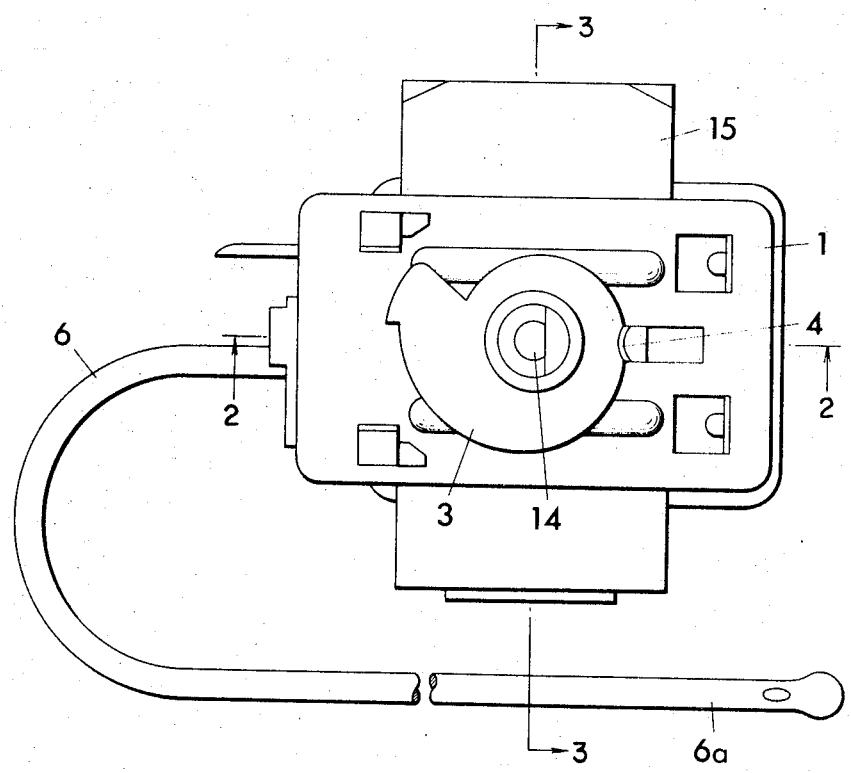
FIG. 1 is a plan view of a bifunctional thermostat device according to the present invention.
Figure 2:
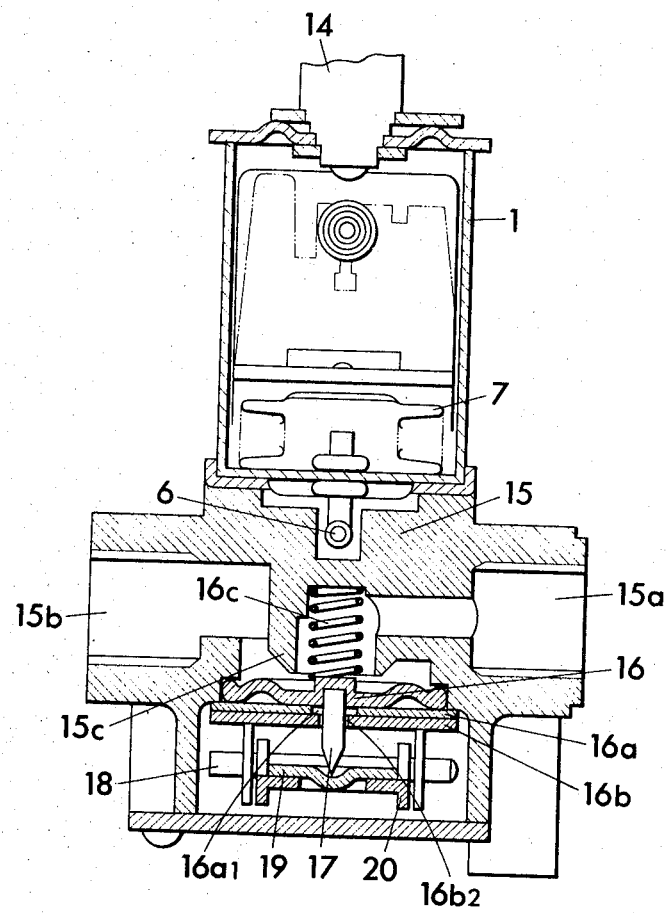
FIG. 2 is a sectional view taken on the line 2—2 of FIG. 1.
Figure 3:
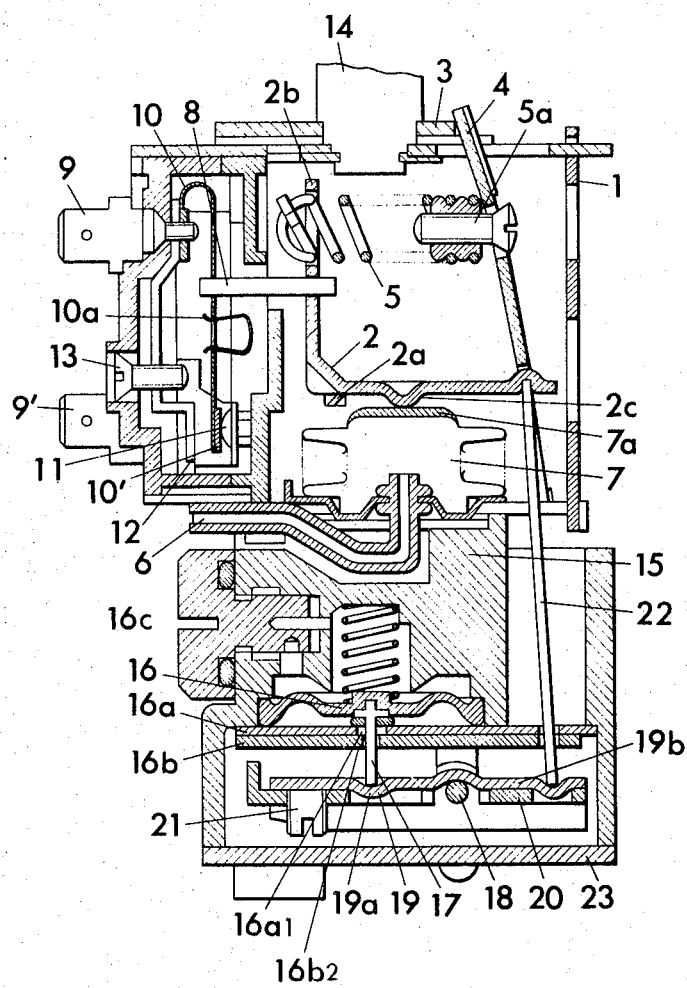
FIG. 3 is a sectional view taken on the line 3—3 of FIG. 1.

Referring now to the drawings, there is shown a casing 1 in which a L-shaped actuating lever 2 is pivotable at a pivot 2a. The L-shaped lever 2 has a first leg portion 2c and second leg portion 2b. A tension spring 5 has one end fixed to leg portion 2b near the upper end thereof. The spring 5 has its other end connected to a cam follower 4 (regulating plate) by means of an adjusting screw 5a. The adjusting screw 5a is screwed in a nut fixedly inserted in the tension spring 5, through the cam follower, as depicted. The cam follower 4, at the upper portion protruding out of the casing 1, abuts a cam 3 fixedly sucured to an adjusting shaft 14 which is journalled in the casing 1. The lower or bottom end of cam follower 4 is rotatably secured to casing 1.

The leg portion 2c of the L-shaped lever 2 is supported by the upper end of a bellows 7 which is connected to an end of a capillary tube 6 having a temperature sensitive member 6a at its free end (FIG. 1). The other leg portion 2b of the L-shaped lever 2 bears a connecting rod 8 of an insulating material, with having one end secured through the leg portion 2b. The connecting rod 8, which extends in the horizontal direction, has its other end fixed to a movable plate contact 10 of a conventional type quick-action snap switch means having a U-shaped compression spring portion 10a and a free end or movable contact 10' (See U.S. Pat. No. 3,182,148). The other end of the movable plate contact 10 is secured to a part of the casing 1 and electrically connected to an electric terminal 9 secured to casing 1. The fixed contact 11, which is electrically connected to the other electric terminal 9' secured to the casing 1 is, positioned opposite to the movable contact 10' and fixed to a partition of the casing 1. The terminals 9,9' are adapted to be connected in an electric heater circuit in the refrigerator. The movable contact 10' is limited, for its movement in the direction away from the fixed contact 11, by an adjusting plate 12 which is controlled by an adjusting screw 13.

A valve bottom wall of casing 15 is secured to the casing 1 and has a gas inlet 15a, a gas outlet 15b and a valve seat 15c positioned therebetween. A valve body of a diaphragm 16, made of an elastic material such as rubber, is positioned opposite to the valve seat 15c and supported by a supporting plate 16a. When the refrigerating temperature is higher than the preset temperature the diaphragm 16 is urged downwardly by a compression spring 16c which is retained within a passage communicating, at its upper end, with the gas inlet 15a. The passage is, at its lower end, communicated to the gas outlet 15b. A pin 17 has its upper end in contact with the lower side of the diaphragm 16, in a recess thereof, and passes through aligned holes 16a1, and 16a2 of said support plate 16a and a plate 16b, respectively. The plate 16b has on its underside a pair of lugs each having a hole through which a pivot pin 18 is inserted. The pin 17 rests on a supporting lever means which is pivotable on pin 18 and comprises an upper plate 19 and a lower plate 20. The lower plate 20 is provided at its opposite sides with a pair of lugs each having a hole. The upper plate has its right end 19b fixed to the lower plate 20 face to face and has a free left end. The free end of the upper plate 19 is supported by a screw member 21 threaded upwardly through lower plate 20. The gap between the upper plate 19 and the lower plate 20 is controlled by regulating the screw member 21. The regulation of the screw member 21 may easily be effected upon removal of a cover plate 23. Pivot pin 18 extends through the holes provided in the lugs of the lower plate 20 and the holes of the lugs of the plate 16b. Thus, the supporting lever means, including the upper and lower plates 19, 20, is pivotally mounted. In the illustration enbodiment, the lower plate 20 has a central cut-out portion so that there is left a space for the pin 17 and a concave portion 19a on which the pin 17 rests. The pin 17 and the supporting lever means including the upper plate 19 and the lower plate 20 cooperate with a rod 22 to form a valve actuating means. The rod 17 has its top end in contact with leg portion 2c of the L-shaped actuating lever and its lower end is supported by the supporting lever means on the upper plate 19 thereof.

The operation of a bifunctional improved thermostat device shown in the drawings will be explained. In order to set a refrigerator temperature, the adjusting shaft 14 is rotated to rotate the cam 3. The rotation of cam causes the cam follower 4 to be moved with respect to leg portion 2b of the L-shaped lever 2 to vary the tension of the spring 5. The force of the L-shaped lever 2 acting on the bellows 7 thus can be adjusted. When the gas pressure in the capillar tube 6 decreases due to the drop of temperature in the sensitive member 6a, the bellow 7 is caused to contract to effect a pivotal movement of the L-sahped lever in the clockwise direction by the tension of the spring 5. The connecting rod 8 is moved to actuate the quick-action snap switch menas so as to disengage movable contact 10' from the fixed contact 11. Thus, a circuit for the electric heater is cut off.

On the other hand, by the same pivotal movement of the L-shaped actuating lever 2, leg portion 2c of the L-shaped actuating lever 2 is moved downwardly to push down the right end portion 19b of the upper plate 19 through the medium of the rod 22. When the right end portion 19b is pushed downwardly, the upper plate 19 rotates about the pivot pin 18 together with the lower plate 20 and, consequently, pushes the pin 17 upwardly. As a result of this, the diaphragm or valve body 16 is urged toward the valve seat 15c against the action of the compression spring 16c, thereby to reduce or completely shut off the gas flow. Thus, the refrigerating operation is stopped.

In case gas pressure in the capillary tube 6 increases due to the increase in temperature of the refrigerator, the device is reversely operated to effect a refrigerating operation by an electric heater or a gas heater.

As described, according to the present invention, a bifunctional thermostat device for a heating type refrigerator having both an electric heater and a gas heater is easily provided and is surely operated. In the present thermostat device, the setting of a refrigerating temperature is easily effected by only rotating a cam shaft. The minute adjustment of a refrigerating temperature is easily effected by means of auxiliary regulating members. Thus, thermostat equipments for an electric heater and a gas heater are effectively combined to provide a single unit of bifunctional thermostat device which requires less space as compared with the conventional devices.

What is claimed is:

1. A bifunctional thermostat device for a heating type refrigerator having both an electric heater and a gas heater which comprises a pressure member actuated responsive to temperature change of a temperature sensitive member; an L-shaped actuating lever which is pivotable at its angular portion and is at its one leg portion in contact with said pressure member; a quick-action snap switch means connected to the other leg portion of said L-shaped actuating lever through the medium of a connecting rod; a cam member for setting a refrigerating temperature; a cam follower which is at its one end in contact with said cam member and is pivotally secured at the other end thereof; a tension spring provided between said other leg portion of the L-shaped actuating lever and said cam follower; a valve including a valve casing and a valve body which are, when the refigerating temperature is higher than the preset temperature, in the open relationship by the action of a compression spring provided therebetween; and a valve actuating means connected to said one leg portion of the L-shaped actuating lever and adapted to actuate said valve body against said compression spring.

2. A bifunctional thermostat device as claimed in claim 1, wherein said valve actuating means comprises a pin which is at its top end in contact with said valve body and resets on a supporting lever means pivotally secured; and a rod which is at its top end in contact with said one leg portion of the L-shaped actuating lever and at its lower end supported by said supporting lever means.

3. A bifunctional thermostat device as claimed in claim 1, wherein said valve body is a diaphragm.

4. A bifunctional thermostat device as claimed in claim 2, wherein said supporting lever means comprises an upper plate and a lower plate; the gap between said upper plate and said lower plate being regulated by means of a screw member screwed in said lower plate.

5. A bifunctional thermostat device as claimed in claim 1, wherein said tension spring has at its end adjacent said cam follower a nut inserted therein; and a screw screwed into said nut, thereby to regulate the action of said tension spring.

6. A bifunctional thermostat device as claimed in claim 1, wherein said quick-action snap switch means has a movable plate contact having one end connected to an electric terminal; a fixed contact connected to another electric terminal and adapted to be connected to and disconnected from the other end of said movable plate contact; and a means to regulate the distance between said other end of the movable plate contact and said fixed contact at their disconnected position.

* * * * *